US008493797B2

(12) United States Patent
Klein

(10) Patent No.: US 8,493,797 B2
(45) Date of Patent: Jul. 23, 2013

(54) MEMORY SYSTEM AND METHOD HAVING VOLATILE AND NON-VOLATILE MEMORY DEVICES AT SAME HIERARCHICAL LEVEL

(75) Inventor: Dean A. Klein, Eagle, ID (US)

(73) Assignee: Round Rock Research, LLC, Jersey City, NJ (US)

( * ) Notice: Subject to any disclaimer, the term of this patent is extended or adjusted under 35 U.S.C. 154(b) by 0 days.

(21) Appl. No.: 13/567,448

(22) Filed: Aug. 6, 2012

(65) Prior Publication Data

US 2012/0297129 A1    Nov. 22, 2012

Related U.S. Application Data

(63) Continuation of application No. 13/051,329, filed on Mar. 18, 2011, now Pat. No. 8,248,861, which is a continuation of application No. 12/830,113, filed on Jul. 2, 2010, now Pat. No. 7,916,553, which is a continuation of application No. 12/497,400, filed on Jul. 2, 2009, now Pat. No. 7,778,092, which is a continuation of application No. 11/656,578, filed on Jan. 22, 2007, now Pat. No. 7,564,722.

(51) Int. Cl.
*G11C 16/04* (2006.01)
*G11B 7/14* (2012.01)

(52) U.S. Cl.
CPC ....................................... *G11B 7/14* (2013.01)
USPC ............ 365/185.33; 365/189.05; 365/189.08; 365/189.2; 365/223

(58) Field of Classification Search
CPC ... G11B 7/14; G11B 7/12; G11B 7/127; G11B 7/131; G11B 7/22; G11B 11/10532; G11B 11/10554; G11B 11/10556

USPC ............... 365/185.33, 189.05, 189.08, 189.2, 365/223
See application file for complete search history.

(56) References Cited

U.S. PATENT DOCUMENTS 6,098,055 A    8/2000   Watanabe
6,256,723 B1   7/2001   Hudson et al.
(Continued)

FOREIGN PATENT DOCUMENTS

EP         1239488 A2    9/2002
WO    2006/026645 A2    3/2006

OTHER PUBLICATIONS

Extended European Search Report dated Nov. 24, 2010 regarding Application No. 07865361.5.

(Continued)

*Primary Examiner* — Thong Q Le
(74) *Attorney, Agent, or Firm* — Lerner, David, Littenberg, Krumholz & Mentlik, LLP

(57) ABSTRACT

A processor-based system includes a processor coupled to core logic through a processor bus. This includes a dynamic random access memory ("DRAM") memory buffer controller. The DRAM memory buffer controller is coupled through a memory bus to a plurality of a dynamic random access memory ("DRAM") modules and a flash memory module, which are at the same hierarchical level from the processor. Each of the DRAM modules includes a memory buffer to the memory bus and to a plurality of dynamic random access memory devices. The flash memory module includes a flash memory buffer coupled to the memory bus and to at least one flash memory device. The flash memory buffer includes a DRAM-to-flash memory converter operable to convert the DRAM memory requests to flash memory requests, which are then applied to the flash memory device.

15 Claims, 2 Drawing Sheets

U.S. PATENT DOCUMENTS

| | | |
|---|---|---|
| 6,476,854 B1 | 11/2002 | Emerson et al. |
| 6,564,286 B2 | 5/2003 | DaCosta |
| 7,152,138 B2 | 12/2006 | Spencer et al. |
| 7,587,559 B2 | 9/2009 | Brittain et al. |
| 2003/0046486 A1 | 3/2003 | Zitlaw |
| 2006/0080501 A1 | 4/2006 | Auerbach et al. |
| 2006/0149857 A1 | 7/2006 | Holman |
| 2006/0221756 A1 | 10/2006 | Miura et al. |
| 2006/0294295 A1 | 12/2006 | Fukuzo |
| 2007/0079065 A1 | 4/2007 | Bonella et al. |
| 2007/0124548 A1 | 5/2007 | Vogt |
| 2007/0162670 A1 | 7/2007 | Yang et al. |
| 2008/0040563 A1* | 2/2008 | Brittain et al. ............ 711/154 |
| 2008/0163032 A1 | 7/2008 | Lastras-Montano |

OTHER PUBLICATIONS

"Non-Final Office Action dated Jan. 14, 2011 regarding Korean Application No. 10-2009-7015356".

* cited by examiner

MEMORY SYSTEM AND METHOD HAVING VOLATILE AND NON-VOLATILE MEMORY DEVICES AT SAME HIERARCHICAL LEVEL

CROSS-REFERENCE TO RELATED APPLICATIONS

This application is a continuation of U.S. patent application Ser. No. 13/051,329, filed on Mar. 18, 2011, which is scheduled to issue on Aug. 21, 2012 as U.S. Pat. No. 8,248,861, which is a continuation of U.S. patent application Ser. No. 12/830,113, filed on Jul. 2, 2010, which is a continuation of U.S. patent application Ser. No. 12/497,400, filed on Jul. 2, 2009, which issued as U.S. Pat. No. 7,778,092 on Aug. 17, 2010, which is a continuation of U.S. patent application Ser. No. 11/656,578, filed Jan. 22, 2007, which issued as U.S. Pat. No. 7,564,722 on Jul. 21, 2009, all of which are hereby incorporated herein by reference.

This invention relates to memory systems, and, more particularly, to a memory system using non-volatile memory in essentially the same location as system memory.

BACKGROUND OF THE INVENTION

Conventional computer systems, such as personal computer systems, generally utilize a hierarchical architecture having several levels. The highest level, which is generally connected to a processor through a processor bus, is a system controller or the like. The system controller includes a memory controller that is connected to system memory, which is generally implemented using dynamic random access memory ("DRAM") devices. The system controller also serves as a bridge, sometimes known as a "North Bridge," to a peripheral bus, such as a peripheral component interface ("PCI") bus. Peripheral components such as hard disk drives, Ethernet interfaces, and the like may be connected to this peripheral bus. A second bus bridge, sometimes known as a "South Bridge," is sometimes used to connect the first peripheral bus to a second peripheral bus, such as an LPC (Low Pin Count) bus. Input/output devices such as keyboards, mice, serial and parallel ports are commonly connected to this bus.

Hard disk drives are typically used in computer systems to store a large volume of data and instructions. Hard disk drives have the advantage of being non-volatile so that data stored in the disk drive are not lost when power is removed from the system. However, hard disk drives also have certain disadvantages. For example, it can require a considerable amount of power to keep hard disk drives powered so they can be available to access data more quickly. Also, since accessing data stored in a hard disk drive normally requires physical movement of a read/write head, the latency period for accessing data can be considerable. To minimize these and other limitations of hard disk drives, proposals have been made to incorporate a small amount of solid state non-volatile memory, such as flash memory devices, in hard disk drives. Using flash memory devices provides several advantages, including lower power consumption, faster access times, and increased reliability.

Although placing flash memory devices in hard disk drives does provide several advantages, these advantages come with a price and are less advantageous than they might be. Specifically, there is a great deal of price competition in the sale of computer system components in general and hard disk drives in particular. Including flash memory devices or other non-volatile memory devices in hard disk drives may increase the price of such hard disk drives to unacceptable levels. This price competition is also likely to keep the amount of flash memory on the hard drive low, and therefore provide limited benefit. Also, although the use of flash memory devices in hard disk drives can significantly reduce the latency of accessing stored data and instructions, the latency and data bandwidth are still limited by the need to couple the data and instructions through one or more bus bridges to the hierarchy level of the hard disk drive.

There is therefore a need for a computer system and method that uses non-volatile memory devices to perform functions typically performed by hard disk drives, but does so in a manner that avoids some of the disadvantages and limitations of conventional hard disk drives incorporating non-volatile memory devices.

DETAILED DESCRIPTION

Figure 1:
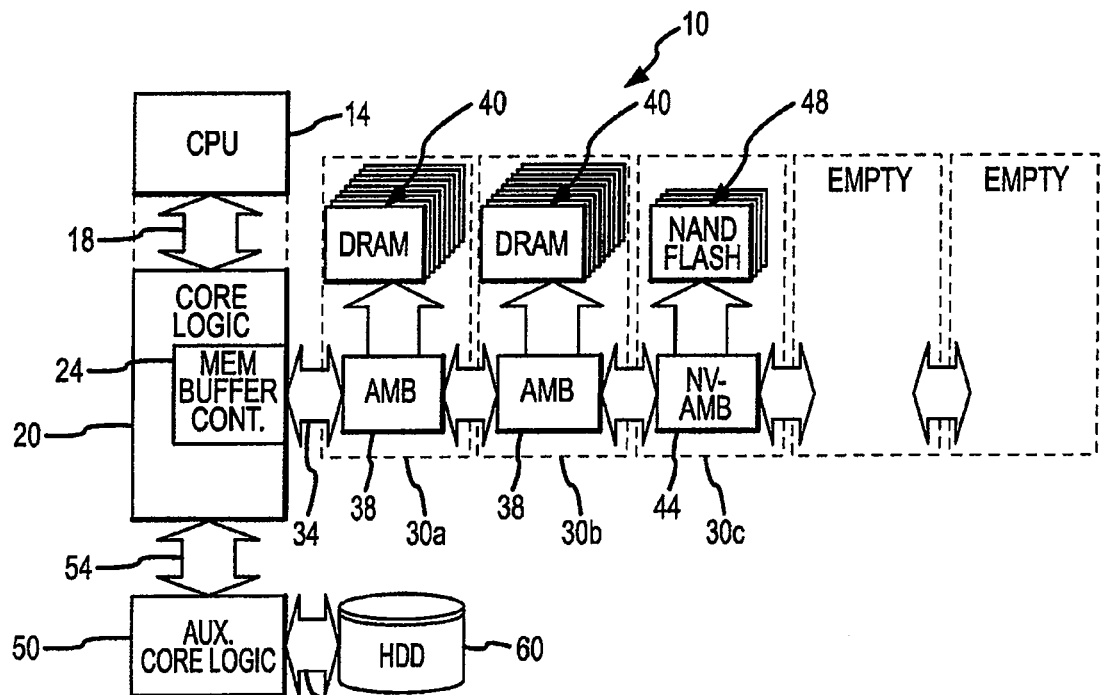
FIG. 1 is a block diagram of a computer system according to one example of the invention.

A computer system 10 according to one example of the invention is shown in FIG. 1. The computer system 10 includes a central processing unit ("CPU") 14 coupled through a processor bus 18 to core logic 20, which performs the function of a conventional system controller. The core logic 20 also includes a memory buffer controller 24, which interfaces with a plurality of system memory modules 30a-c through a memory bus 34.

The first two memory modules 30a,b each include a respective advanced memory buffer ("AMB") 38 that is coupled to a plurality of dynamic random access memory ("DRAM") devices 40. The AMB 38 is a conventional device that receives high-level memory requests from the controller 24, stores the memory requests until they can be executed, and then generates and applies corresponding address, control and write data signals to the DRAM devices 40. In the event the memory request is a read request, the AMB 38 can also receive and store the data read from the DRAM devices 40 until the memory buffer controller 24 can receive the read data. The AMB 38 then transmits the read data to the memory buffer controller 24. The AMB 38 also serves as a path for coupling commands, addresses and write data from the memory buffer controller 24 to a "downstream" memory module 30, and for coupling read data from a downstream memory module to the memory buffer controller 24. For example, when a command and address for a memory request are received by the AMB 38 in the module 30a, the AMB 38 first determines if the request if for one of the DRAMs 40 in the module 40a. If not, the AMB 38 passes the command and address to the AMB 38 in the memory module 30b.

According to one example of the invention, the third memory module 30c includes a non-volatile advanced memory buffer 44 coupled to non-volatile memory, such as a plurality of NAND flash memory devices 48. The buffer 44 may be similar to a conventional flash memory controller, and it is able to generate flash memory control and address signals from the high-level memory requests from the memory buffer controller 24. However, the high-level memory requests received by the buffer 44 are not of the type typically received by a conventional flash memory controller. Instead, the non-volatile advanced memory buffer 44 receives serialized DRAM protocol signals and converts them to flash memory protocol signals. The flash memory devices 48 perform all or some of the functions performed by conventional non-volatile memory devices used in hard disk drives. However, since the flash memory devices 48 are at the same hierarchical level as the system memory DRAM devices 40, the performance and cost disadvantages of the conventional approach are avoided. Although the computer system 10 of FIG. 1 uses NAND flash memory devices 48, it will be understood that other types of non-volatile memory devices may be used.

With further reference to FIG. 1, the core logic 20 also performs the bus bridging function of a conventional system controller to couple auxiliary core logic 50 to the CPU 14 through a first peripheral bus 54 and the processor bus 18. The core logic 50 couples the CPU 14 to a second peripheral bus 58, which is connected to a hard disk drive 60 of conventional design. The disk drive 60 operates in a conventional manner to provide non-volatile storage of data. In conventional computer systems using solid state non-volatile memory, the non-volatile memory is located with the hard disk drive 60 and is thus significantly lower in the hierarchy than the flash memory devices 48.

In the computer system 10 illustrated in FIG. 1, the flash memory devices 48 are located in the last memory module 30c in the chain of memory modules 30a-c. This architecture provides the advantage that the presence of the non-volatile memory module 30c does not adversely affect the latency of access to the DRAM 40 in the other memory modules 30a,b. However, it has the disadvantage of the non-volatile advanced memory buffer 44 being unable to pass commands to the AMBs 38 unless the AMBs were modified to receive upstream memory commands and addresses, i.e., memory commands propagating upstream toward the controller 24. However, modifying the AMBs 38 to receive upstream memory commands and addresses would have the advantage of allowing the non-volatile advanced memory buffer 44 to directly transfer blocks of data to and/or from upstream modules 30a,b. Also, allowing the AMB 38b to receive upstream memory commands and addresses would allow the non-volatile advanced memory buffer 44 to transfer data to and/or from the memory modules 30b at the same time the controller 24 is sending commands and addresses to or receiving read data from the memory module 30a.

Figure 2:
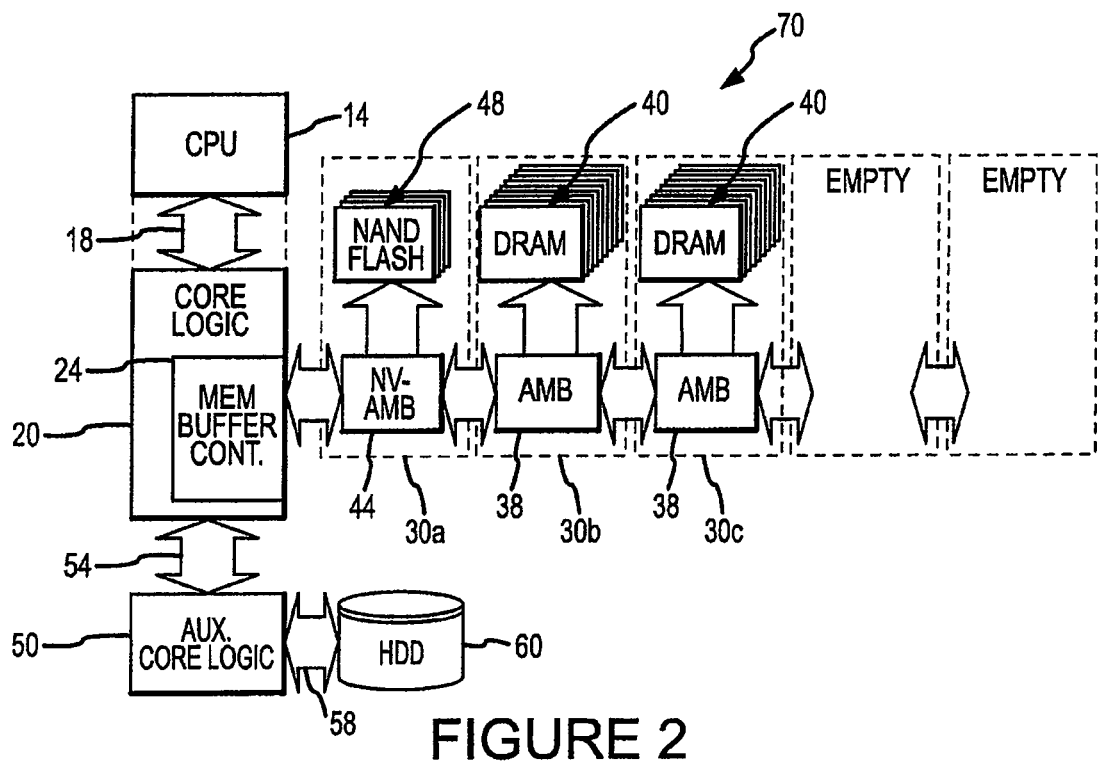
FIG. 2 is a block diagram of a computer system according to another example of the invention.

A computer system 70 according to another example of the invention is shown in FIG. 2. The computer system 70 uses the components that are used in the computer system 10, and they operate in essentially the same manner. Therefore, in the interest of brevity, an explanation of the function and operation of these components will not be repeated. The computer system 70 differs from the computer system 10 of FIG. 1 in that the first memory module 30a includes the non-volatile advanced memory buffer 44 coupled to a plurality of flash memory devices 48. Each of the remaining memory modules 30b,c include one of the AMBs 38 coupled to a plurality of DRAM devices 40. The advantage of this architecture is that the non-volatile advanced memory buffer 44 can issue commands to the AMBs 38 operating in their normal manner to transfer data from the flash memory devices 48 to the DRAMs 40. Operating in this manner can save a substantial amount of time because transferring data stored in the hard disk drive 60 to the DRAMs 40 requires the CPU 14 to read data from the hard disk drive 60 and then write the read data into the DRAMs 40 after the data have been coupled through the core logic 20, 50. Furthermore, by directly controlling the data transfer operation, the non-volatile advanced memory buffer 44 frees the CPU 14 to perform other functions.

Figure 3:
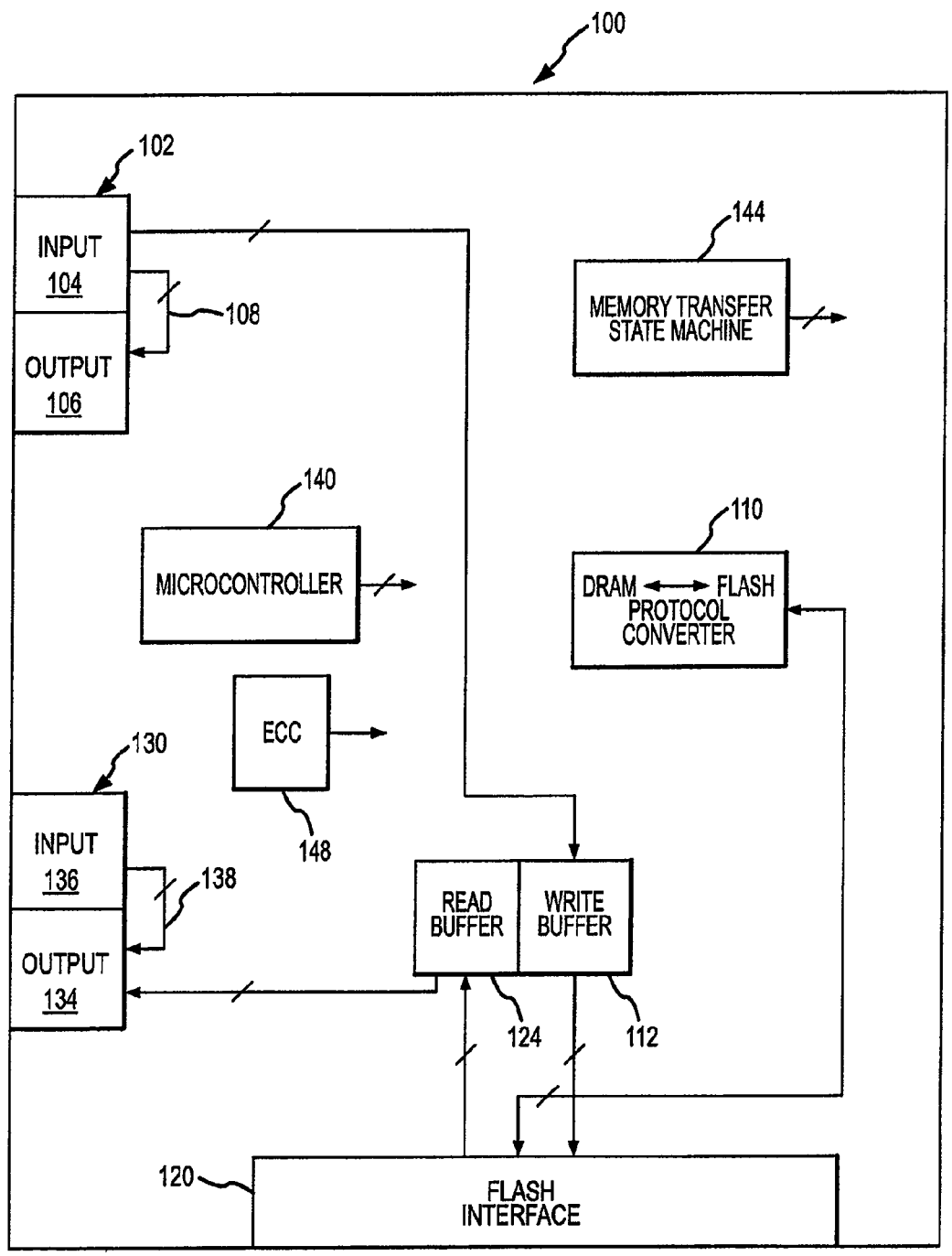
FIG. 3 is an example of a non-volatile advanced memory buffer according to one example of the invention that can be used as the computer system of FIG. 1 or 2 or in some other processor-based system.

An example of a non-volatile advanced memory buffer 100 that can be used as the non-volatile advanced memory buffer 44 in the computer systems 10, 70 is shown in FIG. 3. The buffer 100 includes a downstream link interface 102 that receives memory requests from a memory buffer controller (not shown), such as the memory buffer controller 24 in the core logic 20. The downstream link interface 102 includes two sections, an input section 104 that receives the memory requests from the memory buffer controller, and an output section 106 that passes received memory requests to downstream memory modules. For example, the buffer 100 used in the memory module 30a (FIG. 2) would receive memory requests for the memory module 30b from the memory buffer controller 24 at its input section 104 and pass those requests through a bypass path 108 on to the memory module 30b through the output section 106.

If a memory request received by the input section 104 of the downstream link interface 102 is for the flash memory devices 48, the input section 104 passes the command and address in the memory requests to a DRAM-to-flash protocol converter 110. If the memory request is a write memory request, the write data in the memory request is stored in a write buffer 112. The converter 110 generates signals according to a flash memory protocol for accessing the flash memory devices 48 responsive to received signals that are in accordance with a DRAM protocol. For example, the converter 110 may perform address translations so that an access to a single row is translated to a range of addresses for a block containing the address row since accesses to flash memory devices are normally on a block-by-block basis. In this way, the non-volatile advanced memory buffer 100 can be substituted for an AMB 38 that normally accesses DRAM memory devices 44 as shown in FIGS. 1 and 2.

After the DRAM-to-flash protocol converter 110 has generated command and address signals for accessing flash memory devices and the write buffer 112 has stored any write data signals, these signals are passed to a flash memory device interface 120. The flash memory device interface 120 would be coupled to flash memory devices, such as the NAND flash memory devices 48 used in the systems 10, 70 of FIGS. 1 and 2, respectively. The interface 120 would therefore pass the command and address signals, and possibly write data signals, to the flash memory devices. If the memory request is a read memory request, the flash memory device interface 120 receives read data signals, and then transfers the read data signals to a read buffer 124. The read buffer 124 subsequently applies the read data signals to an upstream link interface 130, and, more particularly, to an output section 134 of the interface 130. The output section 134 couples the read data signals upstream to a memory buffer controller, such as the memory buffer controller 24 shown in FIGS. 1 and 2.

The upstream link interface 130 also includes an input section 136 that receives read data signals from downstream memory modules 30 and passes the read data signals through a bypass path 138 to the output section 134 for coupling to the memory buffer controller.

The operation of the non-volatile advanced memory buffer 100 is controlled by a microcontroller 140 and a memory transfer state machine 144. The microcontroller 140 initiates transfers of memory requests to the flash memory devices at the proper time by applying control signals to the state machine 144. The state machine then generates sets of timed signals that implement the memory access corresponding to the memory access received by the downstream link interface 104. The high operating speed of the state machine 144 allows these timed signals to be generated at a speed that accesses the flash memory devices at their full operating speed. In contrast, using the microcontroller 140 to generate these timed signals would normally not allow the memory accesses to be performed at the full operating speed of the flash memory devices.

The microcontroller 140 can also perform other functions, including handling error correction errors, periodically retrying memory operations that were not completed successfully, etc. The actual processing of error correcting codes to correct data is performed by an ECC circuit 148, which may be a conventional error correcting code circuit such as a Reed-Solomon type of ECC circuit. The microcontroller 140 can also perform other functions, such as performing "wear-leveling" functions. As is well-known in the art, the number of times that flash memory device can be erased is somewhat limited. "Wear-leveling" is a process by which writes preceded by an erase directed to addresses that have been erased a relatively large number of times are mapped to addresses that have been erased a fewer number of times. The wear-leveling function performed by the microcontroller 140 can therefore prolong the useful life of flash memory devices connected to the buffer 100.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A computer system comprising:
a central processing unit;
a processor bus coupling the central processing unit to core logic, the core logic comprising a memory buffer controller;
at least one memory device of a first type;
a memory device of a second type; and
a memory buffer coupled to the memory device of the second type, the memory buffer comprising:
a converter configured to generate a signal according to a protocol for accessing the memory device of the second type responsive to receipt of a memory request of the first type; and
a microcontroller coupled to the converter, the microcontroller configured to receive the signal according to a protocol for accessing the memory device of the second type and generate signals that implement a memory access of the memory device of the second type.

2. The computer system of claim 1, wherein the memory buffer is operable to:
receive and store data read from the memory device of the second type until the core logic can receive the read data; and provide the read data to the core logic when the core logic can receive the read data.

3. The computer system of claim 2, wherein the memory buffer is operable to pass a request received by the memory buffer to the at least one memory device of the first type if the request is not for the memory device of the second type.

4. The computer system of claim 1, wherein the memory device of the second type is at a same hierarchical level as the memory device of the first type.

5. The computer system of claim 1, wherein the memory buffer is a first memory buffer, and wherein the memory device further comprises a second memory buffer coupled to the memory device of the first type, and wherein the first memory buffer is operable to provide commands to the second memory buffer to transfer data from the memory device of the second type to the memory device of the first type.

6. The computer system of claim 1, wherein the memory buffer is operable to control a data transfer operation between the memory device of the second type and the memory device of the first type.

7. The computer system of claim 1, wherein the memory device further comprises an input section, and wherein the input section is operable to pass a command and address in a memory request received by the input section to the converter if the memory request is for the memory device of the second type.

8. The computer system of claim 1, wherein the converter is operable to generate signals according to the protocol for accessing the memory device of the second type responsive to received signals that are in accordance with a protocol for accessing the memory device of the first type.

9. The computer system of claim 8, wherein the converter is operable to perform address translations.

10. The computer system of claim 1, wherein the microcontroller is operable to initiate a transfer of a memory request to the memory device of the second type.

11. The computer system of claim 10, wherein the microcontroller is operable to apply control signals to a state machine.

12. The computer system of claim 10, wherein the microcontroller is operable to perform at least one of handling error correction, retrying memory requests, or wear leveling.

13. The computer system of claim 1, wherein the memory device of the first type comprises a DRAM memory device and wherein the memory device of the second type comprises a non-volatile memory device.

14. The computer system of claim 13, wherein the non-volatile memory device comprises a flash memory device.

15. The computer system of claim 13, wherein the converter is configured to translate a row address to a range of addresses for a block of the nonvolatile memory device containing the row.

* * * * *

UNITED STATES PATENT AND TRADEMARK OFFICE
CERTIFICATE OF CORRECTION

PATENT NO. : 8,493,797 B2  Page 1 of 1
APPLICATION NO. : 13/567448
DATED : July 23, 2013
INVENTOR(S) : Dean A. Klein It is certified that error appears in the above-identified patent and that said Letters Patent is hereby corrected as shown below:

In the Claims

\*\*Column 6, line 7, "claim 2," should read --claim 1,--

Signed and Sealed this
Eighteenth Day of August, 2015

Michelle K. Lee
*Director of the United States Patent and Trademark Office*